United States Patent
Venkatanarayan et al.

(10) Patent No.: US 7,506,074 B2
(45) Date of Patent: Mar. 17, 2009

(54) METHOD, SYSTEM, AND PROGRAM FOR PROCESSING A PACKET TO TRANSMIT ON A NETWORK IN A HOST SYSTEM INCLUDING A PLURALITY OF NETWORK ADAPTORS HAVING MULTIPLE PORTS

(75) Inventors: Anand Venkatanarayan, Karnataka (IN); Aravind Manohar, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 10/637,305

(22) Filed: Aug. 8, 2003

(65) Prior Publication Data

US 2005/0044221 A1 Feb. 24, 2005

(51) Int. Cl.
*G06F 15/16* (2006.01)
*G06F 15/173* (2006.01)

(52) U.S. Cl. .............. 709/250; 249/249; 249/201; 249/238; 249/240; 249/244

(58) Field of Classification Search ........... 709/200, 709/249, 250, 201, 238, 240, 244
See application file for complete search history.

(56) References Cited

U.S. PATENT DOCUMENTS

| | | | |
|---|---|---|---|
| 6,105,151 A | 8/2000 | Mahalingam et al. | |
| 6,272,113 B1 | 8/2001 | McIntyre et al. | |
| 6,314,525 B1 | 11/2001 | Mahalingam et al. | |
| 6,393,483 B1 * | 5/2002 | Latif et al. | 709/226 |
| 6,490,632 B1 * | 12/2002 | Vepa et al. | 709/250 |
| 6,718,486 B1 * | 4/2004 | Roselli et al. | 714/41 |
| 2004/0120501 A1 * | 6/2004 | Celi et al. | 379/265.01 |
| 2004/0205250 A1 * | 10/2004 | Bain et al. | 709/249 |
| 2004/0205414 A1 * | 10/2004 | Roselli et al. | 714/39 |
| 2007/0300204 A1 * | 12/2007 | Andreev et al. | 717/104 |

OTHER PUBLICATIONS

Intel Corporation, "Installing and Configuring Intel Advanced Network Services (ANS) on the Linux 2.2.x and 2.4.x Kernals (Intel 32/64-bit architectures)", [online], © 2002 Intel Corporation, [Retrieved on Apr. 24, 2003]. Retrieved from the Internet at <URL: http://www.intel.com/support/network/adapter/1000/linux/ans.htm>.

(Continued)

*Primary Examiner*—John Follansbee
*Assistant Examiner*—Karen C Tang
(74) *Attorney, Agent, or Firm*—Konrad Raynes & Victor LLP; David W. Victor

(57) ABSTRACT

Provided are a method, system, and program for processing a packet to transmit on a network in a host system including a plurality of network adaptors. A first network receives adaptor a packet, wherein the first network adaptor has a plurality of ports. The first network adaptor performs first load balancing operations to select one network adaptor to transmit the received packet. If the selected network adaptor is a second network adaptor, then forwarding the received packet to the second network adaptor. If the selected network adaptor is the first network adaptor, then performing second load balancing operations with respect to the multiple ports to select one port on which to transmit the packet.

24 Claims, 4 Drawing Sheets

OTHER PUBLICATIONS

U.S. Appl. No. 10/612,695, filed Jul. 2, 2003, entitled "Method, System, and Program for Processing a Packet to Transmit on a Network in a Host System Including a Plurality of Network Adaptors", invented by A. Venkatanarayan and A. Manohar.

US Office Action, issued Apr. 9, 2007, for U.S. Appl. No. 10/612,695.

First Office Action, Nov. 9, 2007, for Chinese Patent Application No. CN200410063399.4, 40 pp. (Translation and Chinese Document).

First Office Action, Nov. 9, 2007, for Chinese Patent Application No. CN200410062053.2, 20 pp. (Translation and Chinese Document).

* cited by examiner

METHOD, SYSTEM, AND PROGRAM FOR PROCESSING A PACKET TO TRANSMIT ON A NETWORK IN A HOST SYSTEM INCLUDING A PLURALITY OF NETWORK ADAPTORS HAVING MULTIPLE PORTS

BACKGROUND OF THE INVENTION

1. Field of the Invention

The present invention relates to a method, system, and program for processing a packet to transmit on a network in a host system including a plurality of network adaptors having multiple ports.

2. Description of the Related Art

A host computer may have multiple network cards to connect the system to a network. In current systems, the host would include a network device driver, which is a software program that executes to interface between the host operating system and the network cards. For hosts including multiple processors, the device driver would select one of the network cards to transmit a packet. The device driver executing in the host typically executes a load balancing algorithm to select a particular network card to transmit the packet. Such load balancing algorithms require a significant amount of host central processing unit (CPU) resources and cycles to execute. The burdens on the host CPU increase as the number of adaptors increase and as the number of transactions being handled by the device driver increases. The CPU resources required to perform load balancing operations can range from 5% to 50% of the CPU capacity, depending on the CPU processing speed, the number of adaptors, and amount of transmission activity.

Notwithstanding, there is a continued need in the art to improve the performance of the device driver and minimize device driver processing burdens on the host processor.

BRIEF DESCRIPTION OF THE DRAWINGS

Referring now to the drawings in which like reference numbers represent corresponding parts throughout.

DETAILED DESCRIPTION OF THE EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
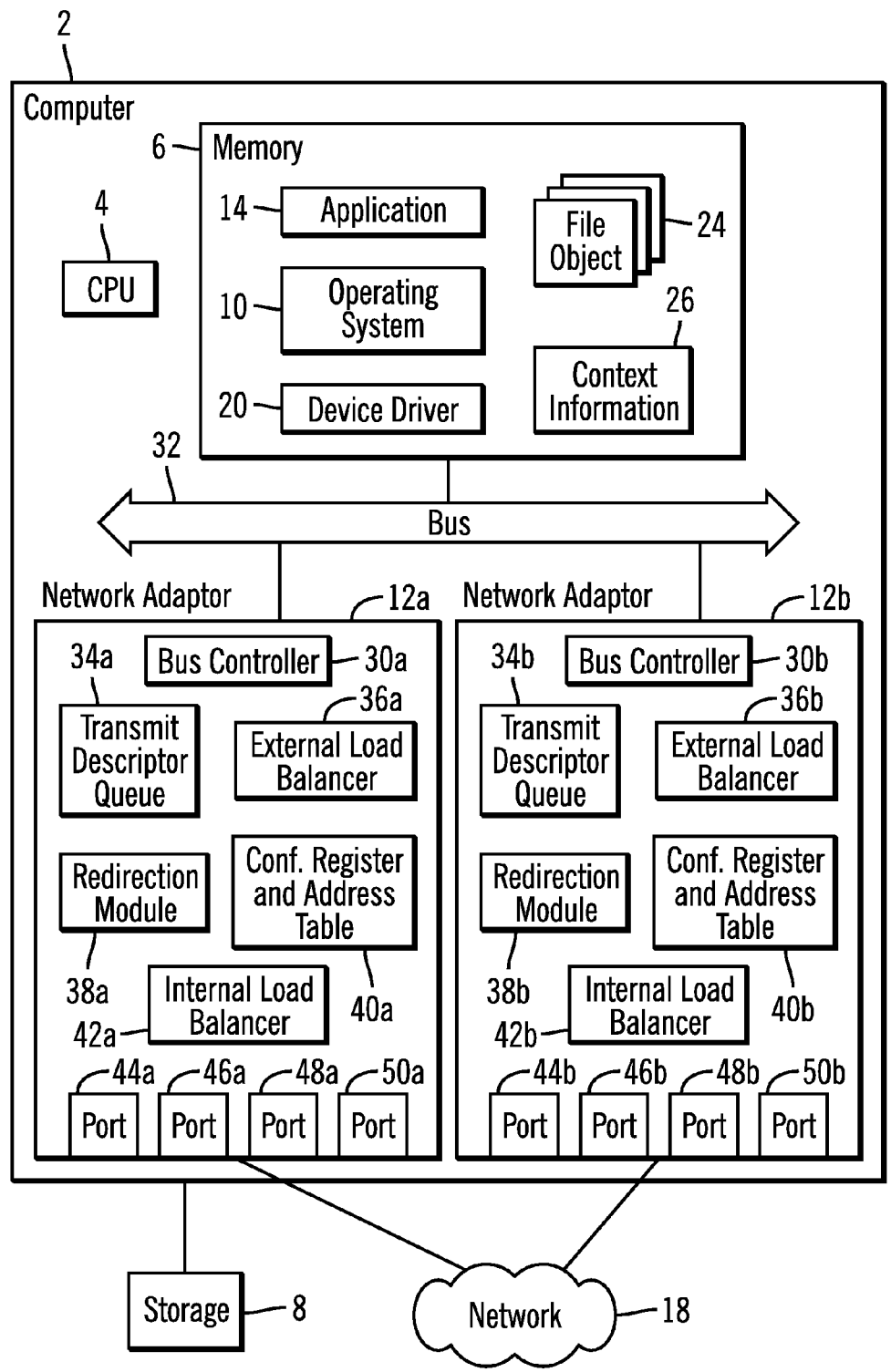
FIG. 1 illustrates a computing environment in which embodiments of the invention are implemented.

FIG. 1 illustrates a computing environment in which embodiments of the invention may be implemented. A host computer 2 includes one or more central processing units (CPU) 4, a volatile memory 6, non-volatile storage 8, an operating system 10, and multiple network adaptors 12a, 12b. Although only two network adaptors are shown, the host 2 may include more than two network adaptors. An application program 14 further executes in memory 6 and is capable of transmitting and receiving packets from a remote computer over the network 18. The host 2 may comprise any computing device known in the art, such as a mainframe, server, personal computer, workstation, laptop, handheld computer, telephony device, network appliance, virtualization device, storage controller, etc. Any CPU 4 and operating system 10 known in the art may be used. Programs and data in memory 6 may be swapped into storage 8 as part of memory management operations.

The network cards 12a, 12b are capable of transmitting and receiving packets of data over network 18, which may comprise a Local Area Network (LAN), the Internet, a Wide Area Network (WAN), Storage Area Network (SAN), wireless network (Wireless Fidelity), etc. A device driver 20 executes in memory 6 and includes network adaptor 12a, 12b specific commands to communicate with the network adaptors 12a, 12b and interface between the operating system 10 and the network adaptors 12a, 12b. The network adaptors 12a, 12b or device driver 20 would implement logic to process the packets, such as a transport protocol layer to process the content of messages included in the packets that are wrapped in a transport layer, such as Transmission Control Protocol (TCP) and/or Internet Protocol (IP), the Internet Small Computer System Interface (iSCSI), Fibre Channel, SCSI, parallel SCSI transport, or any other transport layer protocol known in the art. The transport protocol layer would unpack the payload from the received TCP/IP packet and transfer the data to the device driver 20 to return to the application 14. Further, an application 14 transmitting data would transmit the data to the device driver 20, which would then send the data to the transport protocol layer to package in a TCP/IP packet before transmitting over the network 18.

The network adaptor 12a, 12b may further include a network protocol layer that implements the physical communication layer to send and receive network packets to and from remote devices over a network 18. In certain embodiments, the network adaptor 12a, 12b network protocol layer (not shown) may implement the Ethernet protocol, token ring protocol, Fibre Channel protocol, Infiniband, Serial Advanced Technology Attachment (SATA), parallel SCSI, serial attached SCSI cable, etc., or any other network communication protocol known in the art.

The network adaptors 12a, 12b include various components implemented in the hardware of the adaptors. A bus controller 30a, 30b enables the network adaptor 12a, 12b to communicate on a computer bus 32, which may comprise any bus interface known in the art, such as a Peripheral Component Interconnect (PCI) bus, Small Computer System Interface (SCSI), Serial ATA, etc. A transmit descriptor queue 34a, 34b receives and queues packets transmitted to the adaptor 12a, 12b over the bus 32. An external load balancer 36a, 36b includes logic to implement a load balancing algorithm to select one of the plurality of network adaptors 12a, 12b to transmit the received packet. The external load balancing algorithm may use any load balancing technique known in the art, such as round robin, etc. The external load balancing algorithm implemented in the external load balancer 36a, 36b may determine the relative load at each of the network adaptors 12a, 12b and then select one network adaptor having the lightest load. If the network adaptors include multiple ports, such as shown in FIG. 1, then the load balancing algorithm may load balance based on the number of ports and/or available bandwidth at all ports in the adaptors currently being used. For instance, the external load balancer 36a, 36b may select an adaptor having the most number of active ports or the greatest bandwidth across all active ports. Alternatively, the external load balancing algorithm may select a network adaptor 12a, 12b to handle a packet based on the network address, e.g., IP address, to which the packet is directed. A hash table may be used to associate an IP address with a network adaptor 12a, 12b to transmit that packet. In such hash table implementations, the load balancing block 36a, 36b would hash the target IP address of the packet to select a network adaptor to transmit that packet. In certain implementations, only the network adaptor 12a, 12b operating as the primary adaptor would perform the load balancing operations.

The network adaptors 12a, 12b further include a redirection module 38a, 38b that interfaces with the bus controller 30a, 30b to redirect a packet in the transmit descriptor queue 34a, 34b to another network adaptor 12a, 12b if the load balancing block 36a, 36b determines that another network adaptor 12a, 12b should handle the transmission of the received packet. The redirection module 38a, 38b is only enabled on the primary network adaptor 12a, 12b. The configuration register and address table 40a, 40b provide state information used to indicate the state of the network card. The configuration register 40a, 40b would indicate whether a network adaptor 12a, 12b is a primary or secondary adaptor. The address table 40a, 40b includes the bus addresses of other network adaptors 12a, 12b coupled to the bus 32. The device driver 20 may write to the configuration register 40a, 40b to designate one adaptor 12a, 12b as the primary adaptor.

The adaptors 12a, 12b further each include an internal load balancer 42a, 42b that is used to select one of the ports on a multi port adaptor. FIG. 1 shows each adaptor 12a 12b has having four ports 44a, 46a, 48a, 50a and 44b, 46b, 48b, 50b, respectively. The adaptors 12a, 12b may have more or fewer ports. Further, one of the adaptors may have only one port. The internal load balancer 42a, 42b applies load balancing algorithms to select one available port 44a, 46a, 48a, 50a and 44b, 46b, 48b, 50b, respectively, to use for the transmission, which may comprise the port having the highest available bandwidth or based on some other factor. In certain embodiments, the internal load balancer 42a, 42b may manage the ports by using fewer than all ports for I/Os, i.e., active ports, and reserving one or more of the available ports to use in the event of a failover of one of the active ports. In this way, the internal load balancer 42a, 42b may handle the failover to a reserved port in the event of a failure of an active port. Such embodiments reduce burdens on the computer CPU 4 because the failover operation is handled automatically at the network adaptor 12a, 12b level, not the host system level. The configuration registers 40a, 40b may indicate which ports in an adaptor are active or reserved.

If a network adaptor had only one port, then the packet would be transmitted on such single port without performing any internal load balancing to select among ports.

The network adaptors 12a, 12b may include additional hardware logic to perform additional operations to process received packets from the host 2 or the network 18. Further, the network adaptors 12a, 12b may implement a transport layer offload engine (TOE) to implement the transport protocol layer in the network adaptor as opposed to the host device driver 30 to further reduce host processing burdens. Alternatively, the transport layer may be implemented in the device driver 20.

Figure 2:
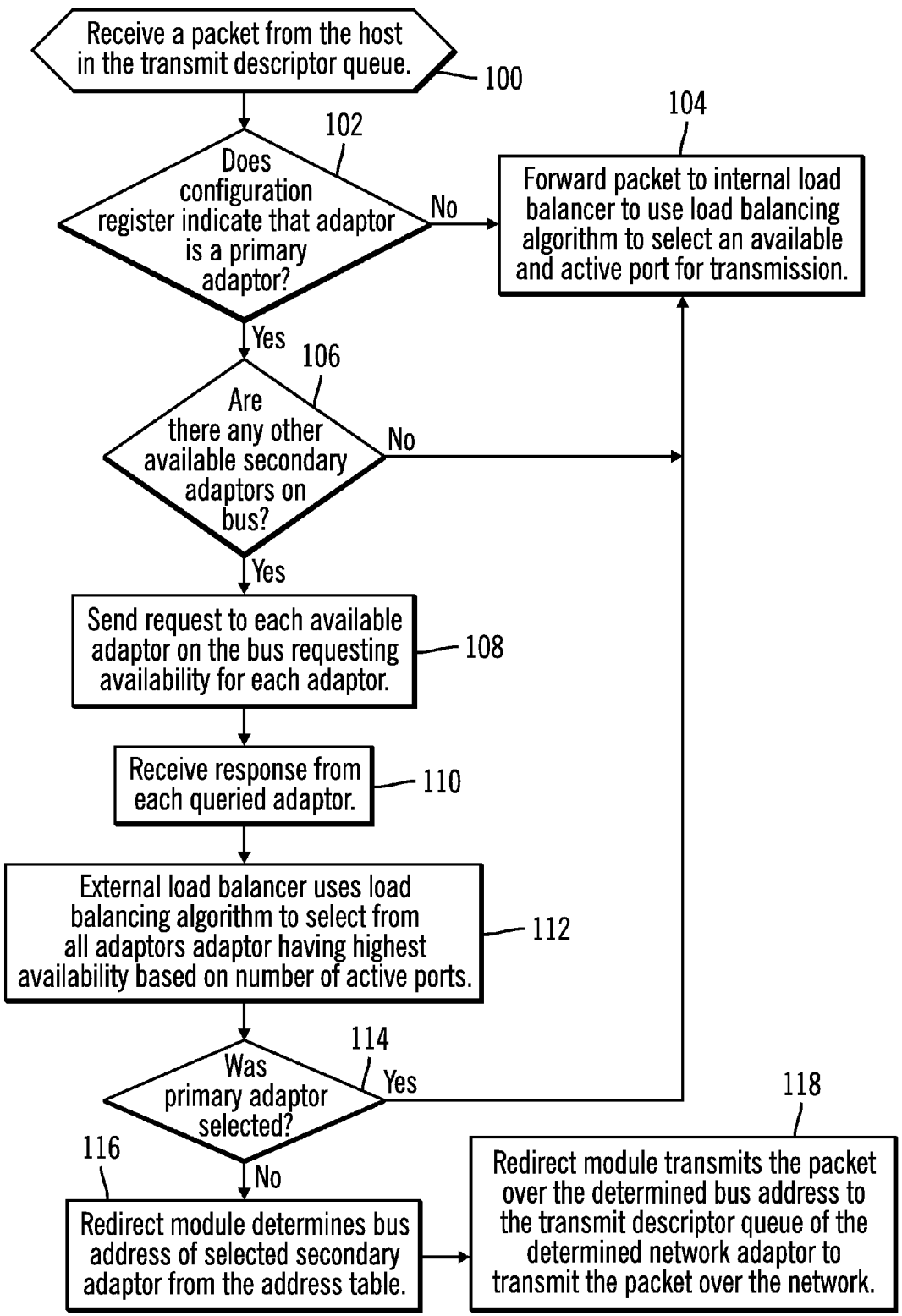
FIG. 2 illustrates a operations to select a network adaptor in accordance with embodiments of the invention.

FIG. 2 illustrates operations performed in the components of the network adaptors 12a, 12b. Upon receiving (at block 100) a packet from the host device driver 20 in the transmit descriptor queue 34a, 34b, if (at block 102) the configuration register 40a, 40b indicates that the network adaptor 12a, 12b is a secondary adaptor, then the queued packet is forwarded (at block 104) to the internal load balancer 42a, 42b to use a load balancing algorithm to select an available and active port, as indicated in the configuration registers 40a, 40b for transmission. If the network adaptor functioning as the secondary adaptor has only one port, than the packet would be transmitted on that single port without any further load balancing. Otherwise, for multi-port adaptors, the received packet is transmitted on the port 44a, 46a, 48a, 50a, 44b, 46b, 48b, 50b selected at block 104. As discussed, any load balancing algorithm known in the art to select one available port, such as selecting the port having the highest available bandwidth, selecting a fixed port designated as the primary port, or round robin to alternate between ports may be used.

If (at block 102) the configuration register 40a, 40b indicates that the network adaptor 12a, 12b is a primary adaptor and if (at block 106) there is at least one secondary network adaptor available on the bus 32, then the external load balancer 36a, 36b sends (at block 108) a request to each available adaptor on the bus 32 requesting availability, where availability can be measured by total bandwidth, active number of ports on adaptor, etc. In certain embodiments, the operation performed at block 108 may only be performed periodically, and the information from each adaptor reused a predetermined number of times before querying the other adaptors for information on their availability and bandwidth. Alternatively, the operation at block 108 may always be performed for each iteration of the logic of FIG. 2. If (at block 106) there are no active secondary adaptors, then control proceeds to block 104 to forward the packet to the internal load balancer 42a, 42b. Upon receiving (at block 110) a response from each queried adaptor 12b on the bus 32, the external load balancer 36a, 36b uses (at block 112) a load balancing algorithm to select from itself (the primary adaptor) and all responding adaptors the adaptor having the highest availability based on some criteria supplied by the queried secondary adaptor, such as number of active ports, bandwidth, etc. If (at block 114) the external load balancer 36a, 36b selected the primary network adaptor 12a, 12b, then the packet is forward to the internal load balancer to process the request at block 104. Otherwise, if (at block 114) a secondary adaptor was selected, then the redirection module 38a, 38b determines (at block 116) from the address table 40a, 40b the bus address of the selected secondary adaptor and transmits (at block 118) the packet in the transmit descriptor queue 34a, 34b over the bus 32 to the determined bus address of the selected secondary network adaptor 12a, 12b. The secondary network adaptor 12a, 12b receiving the packet would then perform the operations in FIG. 2 to process the received packet.

In certain embodiments, the device driver 20 may direct I/O requests to the adaptor 12a, 12b having the greatest number of ports. If multiple network adaptors 12a, 12b have a same number of ports, then one may be selected on some criteria, such as a lowest bus number, alternating scheme, etc. In alternative embodiments, the device driver 20 may designate as a default one network adaptor 12a, 12b as the primary adaptor and always send packets to the designated primary adaptor. In this way, the device driver 20 does not perform any load balancing or selection weighing operations, but just sends the packet to a network adaptor 12a, 12b having a greatest number of ports. In further embodiments, in the event of a failure of the primary adaptor, the device driver 20 could perform a failover operation to designate one surviving network adaptor as the primary adaptor.

Figure 3:
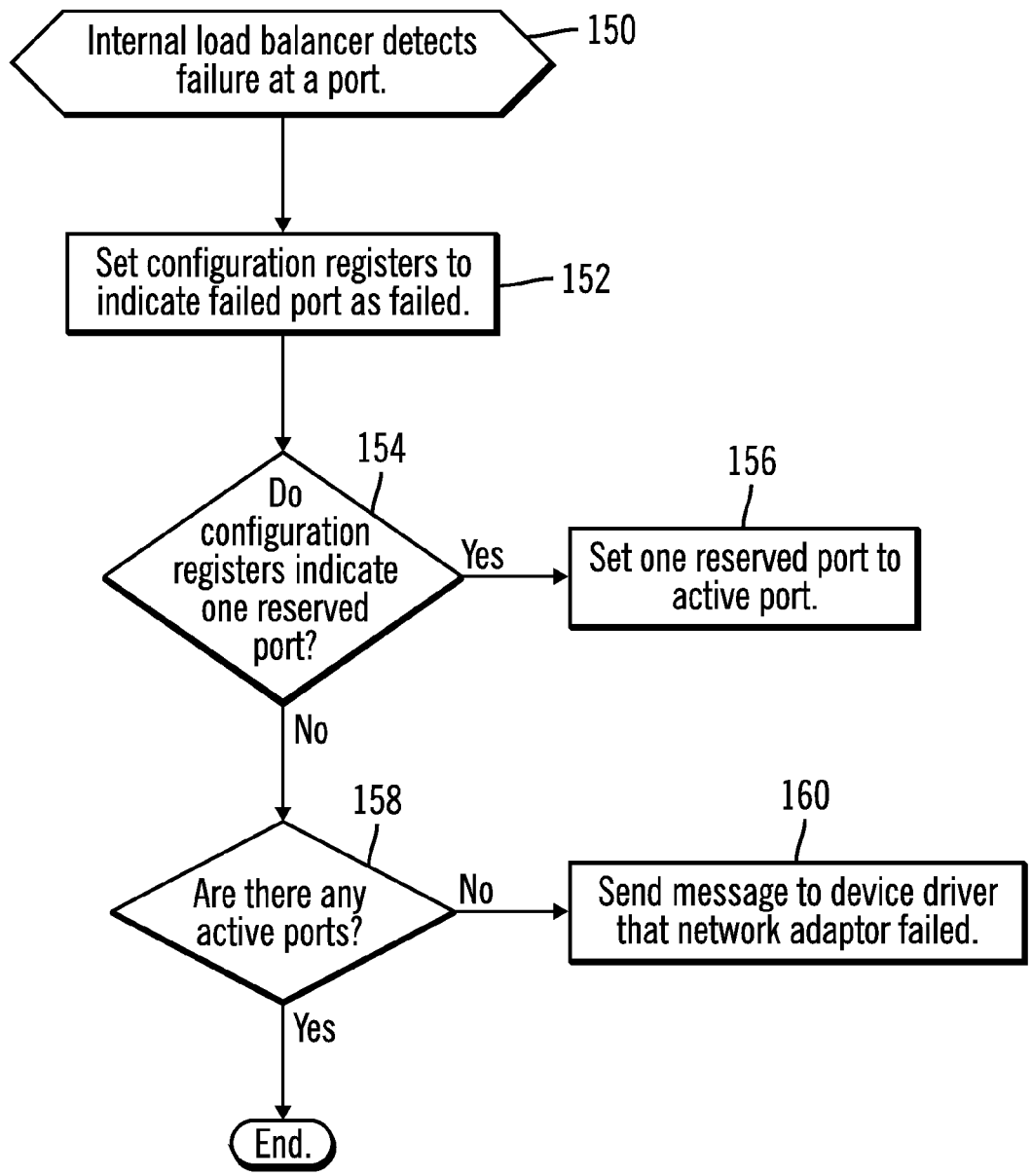
FIG. 3 illustrates operations to handle a port failure in a network adaptor in accordance with embodiments of the invention.

FIG. 3 illustrates operations performed by the internal load balancer 42a, 42b (or other logic in the adaptor) to handle a failover when the network adaptor 12a, 12b includes multiple ports 44a, 46a, 48a, 50a, 44b, 46b, 48b, 50b. Upon detecting (at block 150) the failure of one port 44a, 46a, 48a, 50a, 44b,

46b, 48b, 50b, the internal load balancer 42a, 42b sets (at block 152) the configuration registers 40a, 40b to indicate the failed port as failed. If (at block 154) there is one reserved port, then one of the reserved ports is set (at block 156) to active. If there are no reserved ports and if (at block 158) there are also no more active ports, then the adaptor 12a, 12b sends (at block 158) a message to the device driver 20 that the adaptor has failed. Otherwise, if there is at least one active port, then control ends.

The described operations of FIG. 3 enable each adaptor 12a, 12b having multiple ports to automatically handle a failover to a reserved port if one of the currently used ports fails without notifying the device driver 20. This reduces the workload on the host CPU 4 by relieving the device driver 20 from having to perform the failover operations. In further implementations, the adaptors 12a, 12b may notify the device driver 20 of port failure if a threshold number of ports 44a, 46a, 48a, 50a, 44b, 46b, 48b, 50b are unavailable or if the adaptor 12a, 12b lost an active port that cannot be replaced by a reserved port. Such notification will allow the device driver 20 to adjust, if necessary, its selection of the primary adaptor 12a, 12b when device driver selection of the primary adaptor 12a, 12b is based on the number of active ports at the adaptor.

The described implementations substantially reduce host CPU utilization by offloading the load balancing and failover operations from the host device driver to the network adaptor hardware by having the network adaptors perform teaming operations to transfer packets to the network adaptor most suitable to transmit a packet according to load balancing algorithms implemented in the network adaptor logic. Further, the described embodiments reduce processor overhead with a nominal increase in I/O overhead to transfer packets over the bus 32 between network adaptors. I/O overhead is nominal because only a portion of the packets are transferred over the bus to a secondary adaptor if certain load balancing conditions are satisfied.

Additional Embodiment Details

The described techniques for processing packets of data may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, the external and internal load balancing logic was implemented in network adaptor hardware. In additional implementations, the network adaptor may include a processor and memory to execute instructions loaded into memory to perform the load balancing operations, as opposed to implementing the load balancing logic in hardware, such as an Application Specific Integrated Circuit (ASIC).

In the described implementations, the secondary network adaptors upon receiving a packet would transmit such packet and not perform any further external load balancing operations. In further implementations, the secondary network packet receiving a redirected packet from a primary network adaptor may perform additional external load balancing operations to determine whether to transmit or redirect the packet to another network adaptor.

The network adaptor may be implemented in a network adaptor card inserted in a slot of the host 2, such as a PCI card. Alternatively, the network adaptor may comprise integrated circuit components mounted on the host 2 motherboard.

In certain implementations, the device driver and network adaptor embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In certain implementations, the network adaptor may be configured to transmit data across a cable connected to a port on the network adaptor. Alternatively, the network adaptor embodiments may be configured to transmit data over a wireless network or connection, such as wireless LAN, Bluetooth, etc.

In the described implementations, the device driver 20 did not perform load balancing operations and load balancing operations were performed in the primary network adaptors 12a, 12b. In alternative implementations, the device driver 20 may perform certain load balancing algorithms to select one network adaptor, and then the selected network adaptor may perform further, more intensive, external load balancing operations to improve the capability of selecting an optimal network adaptor to handle the request.

The illustrated logic of FIGS. 2 and 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 4:
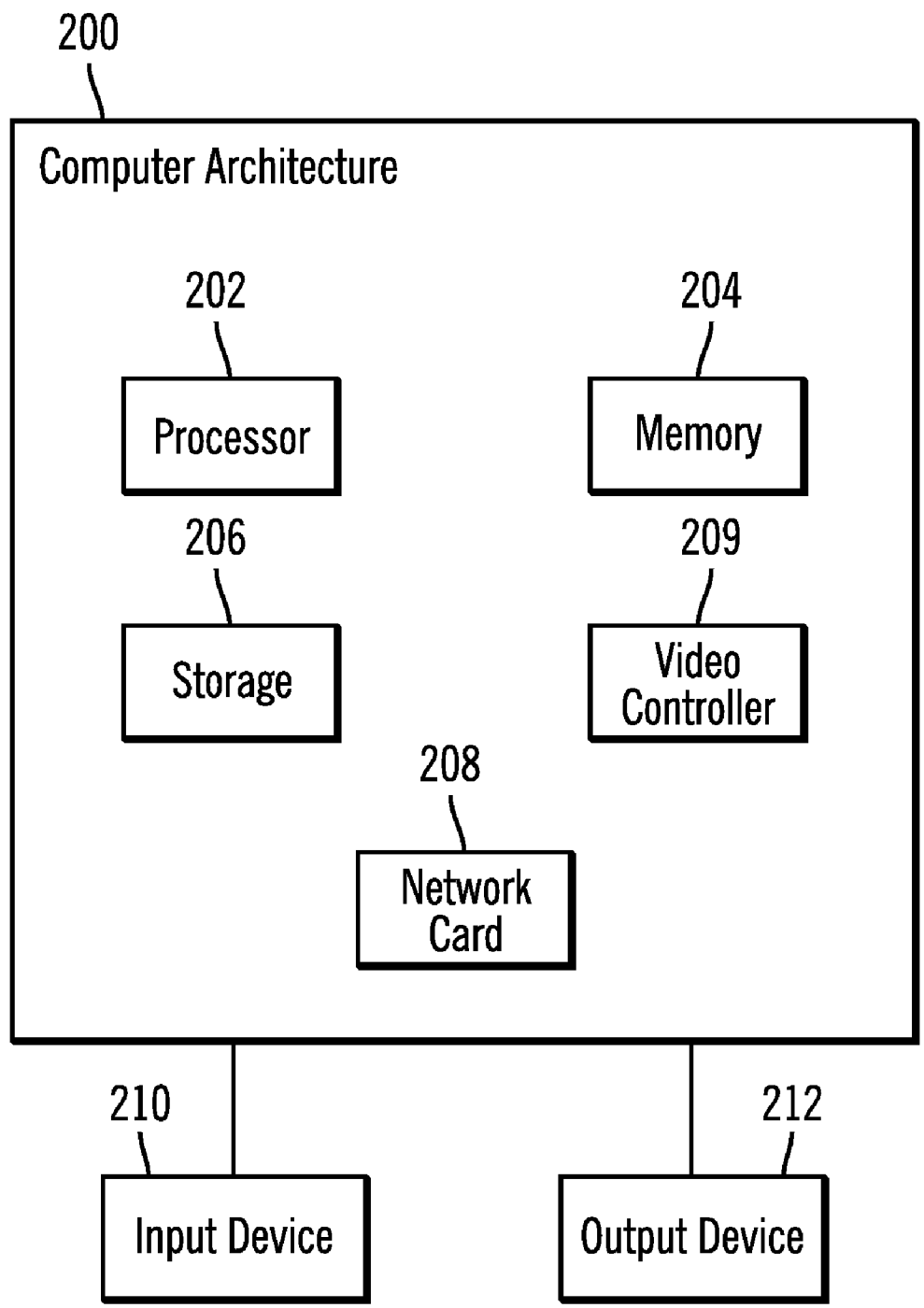
FIG. 4 illustrates a computer architecture that may be used with the described embodiments.

FIG. 4 illustrates one implementation of a computer architecture 200 of the network components, such as the hosts shown in FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network, such as an Ethernet, a Fibre Channel Arbitrated Loop, etc. Further, the architecture may, in certain embodiments, include a video controller 209 to render information on a display monitor, where the video controller 209 may be implemented on a video card or integrated on integrated circuit components mounted on the motherboard. As discussed, certain of the network devices may have multiple network cards. An input device 310 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a packet to transmit on a network in a host system including a plurality of network adaptors, comprising:

receiving at a receiving network adaptor a packet, wherein the receiving network adaptor has a plurality of ports;

implementing, within the receiving network adaptor, a first load balancing algorithm to select one of the network adaptors to transmit the received packet;

if the selected network adaptor is not the receiving network adaptor, then forwarding, with the receiving network adaptor, the received packet to the selected network adaptor; and implementing a second load balancing algorithm with respect to the multiple ports to select one port in the receiving network adaptor on which to transmit the packet in response to determining that the selected network adaptor is the receiving network adaptor.

2. The method of claim 1, further performing:

determining, with the receiving network adaptor, whether the receiving network adaptor is a primary network adaptor or a secondary network adaptor, wherein the second load balancing algorithm selects one port in the receiving network adaptor on which to transmit the packet in response to determining that the receiving network adaptor is the secondary network adaptor; wherein the first load balancing algorithm selects one of the network adaptors in response to determining that the receiving network adaptor is the primary network adaptor.

3. The method of claim 2, wherein only the first load balancing algorithm implemented in the primary network adaptor selects one of the network adaptors.

4. The method of claim 1, wherein the first load balancing algorithm selects one network adaptor based on a number of ports available at each network adaptor.

5. The method of claim 4, further comprising:

querying, with the receiving network adaptor, each of the plurality of network adaptors to determine a number of available ports at each network adaptor; and receiving, from each of the plurality of network adaptors, information on the number of available ports, wherein the information on the available ports is used by the first load balancing algorithm.

6. The method of claim 1, wherein the second load balancing algorithm is implemented in the receiving network adaptor to select one port in the receiving network adaptor on which to transmit the packet.

7. A method implemented in a device driver executing in a host system for processing a packet to transmit on a network, wherein the host includes a plurality of network adaptors, and wherein the device driver performs:

designating one of the plurality of network adaptors as a primary network adaptor based on an available number of ports in each of the plurality of network adaptors, wherein the network adaptors include the primary network adaptor and at least one secondary network adaptor; receiving a packet; and initiating transmission of the packet to the primary network adaptor, wherein the primary network adaptor implements a first load balancing algorithm to select one of the primary and secondary network adaptors to transmit the received packet and, in response to the first load balancing algorithm selecting one secondary network adaptor, the primary network adaptor redirects the packet to one of the at least one secondary network adaptors to transmit the packet and, in response to the first load balancing algorithm selecting the primary network adaptor, the primary network adaptor implements a second load balancing algorithm with respect to multiple ports on the primary network adaptor to select one of the ports on which to transmit the packet.

8. The method of claim 7, wherein the device driver does not perform load balancing operations when selecting one of the plurality of network adaptors to receive the packet.

9. The method of claim 7, wherein the device driver further performs:

detecting a failure of one network adaptor designated as the primary network adaptor;

performing the operation of designating one of the remaining available network adaptors as the primary network adaptor based on the available number of ports in the network adaptors; and configuring a register within the determined network adaptor to cause the determined network adaptor to operate as the primary network adaptor and perform load balancing operations.

10. A network adaptor in a host system in communication with at least one external network adaptor, comprising:

a plurality of ports;

an interface to interface with at least one external network adaptor;

control logic to cause the network adaptor to perform operations, the operations comprising:

receive a packet;

implementing a first load balancing algorithm to select one of the network adaptors to transmit the received packet;

if the selected network adaptor is one of the at least one external network adaptors, then forwarding the received packet to the selected network adaptor; and implement a second load balancing algorithm with respect to the multiple ports to select one port in the network adaptor on which to transmit the packet in response to determining that the selected network adaptor is not one of the at least one external network adaptors.

11. The network adaptor of claim 10, wherein before performing the first load balancing operations, the operations caused by the control logic further comprise:
determine whether the network adaptor is a primary network adaptor or a secondary network adaptor, wherein the second load balancing algorithm selects one port on which to transmit the packet in response to determining that the network adaptor is the secondary network adaptor, wherein the first load balancing algorithm selects one of the network adaptors in response to determining that the network adaptor is the primary network adaptor.

12. The network adaptor of claim 10, wherein the first load balancing algorithm selects one network adaptor based on a number of ports available at each network adaptor.

13. The network adaptor of claim 10, wherein the operations caused by the control logic further comprise:
querying each of the plurality of network adaptors to determine a number of available ports at each network adaptor; and
receiving, from each of the plurality of network adaptors, information on the number of available ports, wherein the information on the available ports is used in the first load balancing operation.

14. A system coupled to a network and data storage, comprising:
a processor;
a storage controller managing Input/Output (I/O) access to the data storage;
a plurality of network adaptors capable of transmitting and receiving data on the network;
a device driver, executed by the processor, to perform operations, the operations comprising:
designating one of the plurality of network adaptors as a primary network adaptor based on an available number of ports in each of the plurality of network adaptors, wherein the network adaptors include the primary network adaptor and at least one secondary network adaptor;
receiving a packet; and
initiating transmission of the packet to the primary network adaptor, wherein the primary network adaptor implements a first load balancing algorithm to select one of the primary and secondary network adaptors to transmit the received packet and, in response to the first load balancing algorithm selecting one secondary network adaptor, the primary network adaptor redirects the packet to one of the at least one secondary network adaptors to transmit the packet and, in response to the first load balancing algorithm selecting the primary network adaptor, the primary network adaptor implements a second load balancing algorithm with respect to multiple ports on the primary network adaptor to select one of the ports on which to transmit the packet.

15. The system of claim 14, wherein the device driver does not perform load balancing operations when selecting one of the plurality of network adaptors to receive the packet.

16. An article of manufacture for processing a packet to transmit on a network coupled to a host system including a plurality of network adaptors, wherein the article of manufacture causes operations to be performed in a receiving network adaptor receiving a packet and having a plurality of ports, the operations comprising:
receiving a packet, wherein the receiving network adaptor has a plurality of ports;
implementing a first load balancing algorithm to select one of the network adaptors to transmit the received packet;
if the selected network adaptor is not the receiving network adaptor, then forwarding the received packet to the selected network adaptor; and
implementing a second load balancing algorithm with respect to the multiple ports to select one port in the receiving network adaptor on which to transmit the packet in response to determining that the selected network adaptor is the receiving network adaptor.

17. The article of manufacture of claim 16, wherein the operations further comprise:
determining, with the receiving network adaptor, whether the receiving network adaptor is a primary network adaptor or a secondary network adaptor, wherein the second load balancing algorithm selects one port in the receiving network adaptor on which to transmit the packet in response to determining that the receiving network adaptor is the secondary network adaptor, and wherein the first load balancing algorithm selects one of the network adaptors in response to determining that the receiving network adaptor is the primary network adaptor.

18. The article of manufacture of claim 17, wherein only the first load balancing algorithm in the primary network adaptor selects one of the network adaptors.

19. The article of manufacture of claim 16, wherein the first load balancing algorithm selects one network adaptor based on a number of ports available at each network adaptor.

20. The article of manufacture of claim 19, further comprising:
querying each of the plurality of network adaptors to determine a number of available ports at each network adaptor; and
receiving, from each of the plurality of network adaptors, information on the number of available ports, wherein the information on the available ports is used in the first load balancing operation.

21. The article of manufacture of claim 16, wherein the second load balancing algorithm is implemented in the receiving network adaptor to select one port in the receiving network adaptor on which to transmit the packet.

22. An article of manufacture for processing a packet to transmit on a network, in a host that includes a plurality of network adaptors, wherein the article of manufacture causes operations to be performed, the operations comprising:
designating one of the plurality of network adaptors as a primary network adaptor based on an available number of ports in each of the plurality of network adaptors, wherein the network adaptors include the primary network adaptor and at least one secondary network adaptor;
receiving a packet; and
initiating transmission of the packet to the primary network adaptor, wherein the primary network adaptor implements a first load balancing algorithm to select one of the primary and secondary network adaptors to transmit the received packet and, in response to the first load balancing algorithm selecting one secondary network adaptor, the primary network adaptor redirects the packet to one of the at least one secondary network adaptors to transmit the packet and, in response to the first load balancing algorithm selecting the primary network adaptor, the primary network adaptor implements a second load balancing algorithm with respect to multiple ports on the primary network adaptor to select one of the ports on which to transmit the packet.

23. The article of manufacture of claim 22, wherein the device driver does not perform load balancing operations when selecting one of the plurality of network adaptors to receive the packet.

24. The article of manufacture of claim 22, wherein the device driver further performs:

detecting a failure of one network adaptor designated as the primary network adaptor;

performing the operation of designating one of the remaining available network adaptors as the primary network adaptor based on the available number of ports in the network adaptors; and configuring a register within the determined network adaptor to cause the determined network adaptor to operate as the primary network adaptor and perform load balancing operations.

* * * * *